_United States Patent_ [19]

Okino

[11] Patent Number: 4,924,261

[45] Date of Patent: May 8, 1990

[54] IMAGE FORMING METHOD

[75] Inventor: Yoshiharu Okino, Kanagawa, Japan

[73] Assignee: Fuji Photo Film Co., Ltd., Kanagawa, Japan

[21] Appl. No.: 398,584

[22] Filed: Aug. 25, 1989

[30] Foreign Application Priority Data

Sep. 14, 1988 [JP] Japan ............................... 63-228335

[51] Int. Cl.$^5$ ............................................. G03B 27/72
[52] U.S. Cl. ..................................... 355/35; 355/38; 355/69; 355/70
[58] Field of Search ....................... 355/35, 38, 69, 70, 355/326, 27, 327, 77; 358/75, 80, 300; 346/157

[56] References Cited

U.S. PATENT DOCUMENTS

| 4,251,154 | 2/1981 | Russel | 355/326 |
| 4,463,079 | 7/1984 | Naito et al. | 430/203 |
| 4,474,867 | 10/1984 | Naito et al. | 430/203 |
| 4,478,927 | 10/1984 | Naito et al. | 430/203 |
| 4,483,914 | 11/1984 | Naito et al. | 430/203 |
| 4,500,625 | 2/1985 | Kita et al. | 430/149 |
| 4,507,380 | 3/1985 | Naito et al. | 430/203 |
| 4,551,011 | 11/1985 | Yuasa et al. | 355/35 |

FOREIGN PATENT DOCUMENTS

| 58-149046 | 9/1983 | Japan . |
| 58-149047 | 9/1983 | Japan . |
| 59-152440 | 8/1984 | Japan . |
| 59-154445 | 9/1984 | Japan . |
| 59-165054 | 9/1984 | Japan . |
| 59-168439 | 9/1984 | Japan . |
| 59-174832 | 10/1984 | Japan . |
| 59-174833 | 10/1984 | Japan . |
| 59-174834 | 10/1984 | Japan . |
| 59-174835 | 10/1984 | Japan . |
| 59-180548 | 10/1984 | Japan . |

Primary Examiner—L. T. Hix
Assistant Examiner—D. Rutledge
Attorney, Agent, or Firm—Sughrue, Mion, Zinn, Macpeak & Seas

[57] ABSTRACT

An image forming method which enables switching between a frame sequential system and a dot sequential system, thereby providing a color recording system of reduced cost and which is capable of an increased speed of recording operation. Three separate light-emitting elements are provided emitting light in three primary colors. Simultaneous three-color exposure or sequential monochromatic exposure of a photosensitive material is selected in response to a three-color light signal derived from an original document or the like, and the light-emitting elements are then driven either simultaneously or separately.

3 Claims, 3 Drawing Sheets

IMAGE FORMING METHOD

BACKGROUND OF THE INVENTION

The present invention relates to an image forming method for obtaining a color image by exposing a photosensitive material with light of three colors.

A heat developable photosensitive material for use as an image recording material has been well known in the art. Heat developable photosensitive materials and processes for such materials are described, for example, in Photographic Industry's issue on "Basic Nonsilver Salt Photography," Corona Publishing Co., 1982, pp. 242–255, Video Information, April 1978, p. 40, and Neblett's Handbook of Photography and Reprography, 7th ed., Van Nostrand, Reinhold & Co., pp. 32–33.

In addition, there have been proposed many methods for obtaining color images by heat developing.

For instance, there have been proposed a method in which a mobile dye is released by heating in the form of an image, and the mobile dye is transferred onto a dye fixing material containing a mordant by the use of a solvent such as water, a method in which the mobile dye is transferred onto a dye fixing material by means of an organic solvent having a high boiling point, a method in which the mobile dye is transferred onto a dye fixing material by means of a hydrophilic solvent incorporated in the dye fixing material, and a method in which a mobile dye of a heat diffusion or sublimatory type is transferred onto a dye acceptor such as a substrate. (See as examples, U.S. Pat. Nos. 4,463,079, 4,474,867, 4,478,927 and 4,507,380, Japanese Laid-Open Patent Publications Nos. 58-149046, 58-149047, 59-1522440, 59-154445, 59-165054, 59-180548, 59-168439, 59-174832, 59-174833, 59-174834 and 59-174835.)

As a device for carrying out image formation of the above-mentioned type, there has been proposed an image forming device as disclosed, for example, in Japanese Laid-Open Patent Publication 59-75247 in which, following exposure in an exposing unit, a color image is transferred to a heat developable photosensitive material by the use of an exposing head, the photosensitive material is sent to a heat developing unit, the heat developable photosensitive material subjected to heat developing with an image-receiving material fixed thereto is sent to a transfer unit, and the image is thermally transferred onto the image-receiving material in the transfer unit.

Further, there has been proposed an image forming device in which, following the application of an image forming solvent to at least one of a photosensitive material and an image-receiving material, heat developing and heat transfer are executed simultaneously by superposing the photosensitive material and the image-receiving material.

Image forming devices may be generally divided into two categories, namely, the frame sequential system and the dot sequential system, depending upon the mode of scanning used for exposing the photosensitive material.

In the frame sequential system, a photosensitive material is sequentially exposed by driving light-emitting elements provided for each of the three primary colors. In this system, there are required at least three exposure scannings to form a color image, as a result of which the required exposure time is long.

In the dot sequential system, three light-emitting elements corresponding to the three primary colors are driven simultaneously, and the emitted radiations are combined to expose the photosensitive material, whereby exposure can be completed within a short time.

Further, in the dot sequential system, information for the three colors is stored temporarily in a buffer memory for one image plane portion, the information is read simultaneously on a dot-by-dot basis for three colors from the memory to drive the light-emitting elements, and the radiations emitted from the respective light-emitting elements are optically combined. Consequently, there is a problem in that a memory of large capacity is required, leading accordingly to a high cost of production.

SUMMARY OF THE INVENTION

It is, therefore, an object of the present invention to eliminate the above-mentioned problems, and to provide an image forming method which enables switching between the frame sequential system and the dot sequential system, thereby enabling a reduction in cost and increase in the speed of the recording operation.

The above-mentioned and other objects of the present invention can be attained by an image forming method for obtaining a color image by exposing a photosensitive material to light of three colors, for which there are provided an exposure control circuit that drives at least three light-emitting elements that emit light of three colors selectively simultaneously or separately, and a control circuit which selects simultaneous three-color exposure or monochromatic exposure for the photosensitive material by controlling the simultaneous driving or separate driving of the light-emitting elements in response to a signal for three-color light supplied to the exposure control circuit.

In the case of exposing the photosensitive material in accordance with the frame sequential system, a three-color signal is sequentially supplied for each image plane to a color correction arithmetic circuit, and a sequential color signal is obtained by monochromatically correcting the gradation with an exposure control circuit. In addition, the exposure control circuit is separately controlled by the control circuit. The photosensitive material is exposed by the light emitted sequentially by driving the light-emitting elements. In the frame sequential system, the photosensitive material is monochromatically exposed three times for each of the three primary colors, but exposure scanning may be carried out either in the forward or reverse scanning stroke.

Further, in the case of exposing the photosensitive material according to the dot sequential system, signals of three colors are supplied simultaneously to the color correction arithmetic circuit, and the corrected color signals are supplied simultaneously to the exposure control circuit. The exposure control circuit is simultaneously controlled by the control circuit to drive simultaneously the respective elements, and the photosensitive material is simultaneously exposed by optically combining the light emitted by the light-emitting elements.

With this arrangement, according to the present invention, it is possible to form an image using either the frame sequential system or the dot sequential system without requiring a memory of large capacity.

DESCRIPTION OF THE PREFERRED EMBODIMENTS

Figure 1:
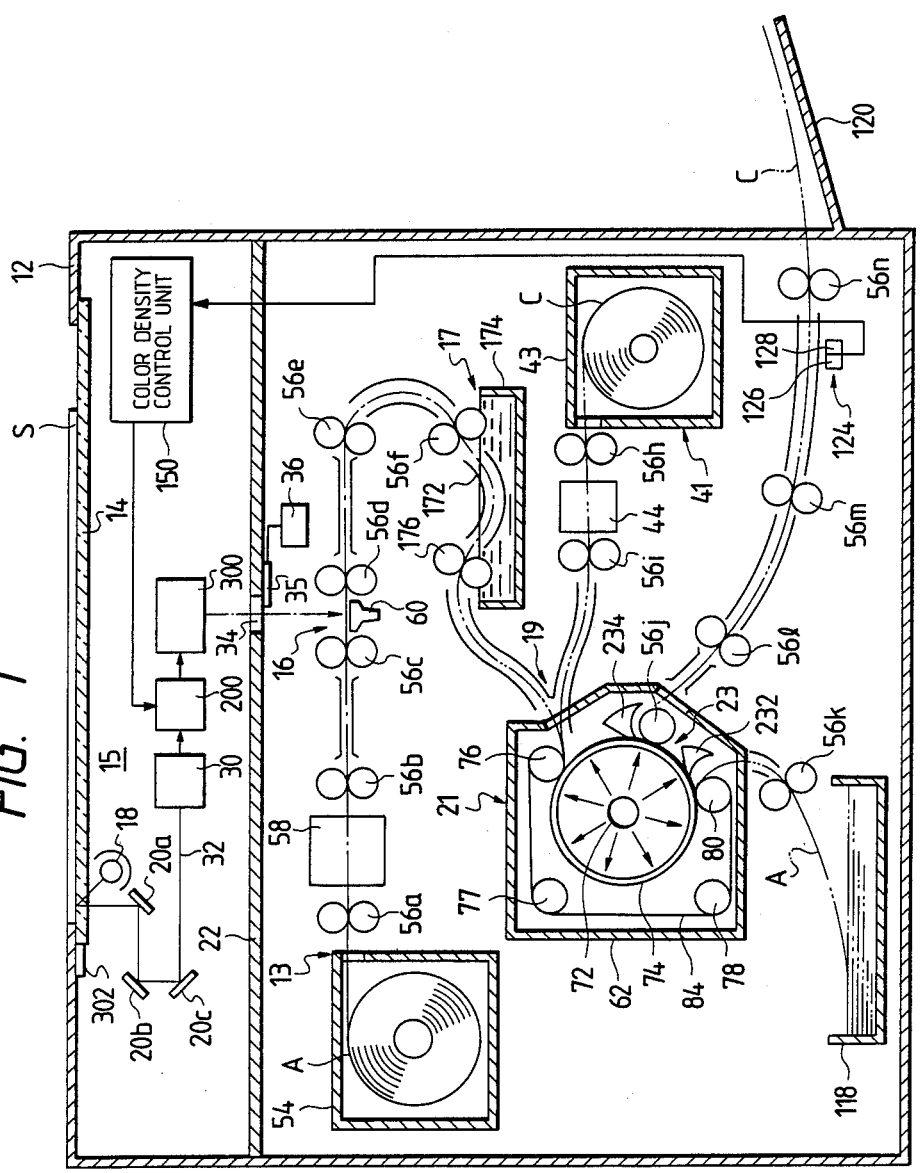
FIG. 1 is a schematic block diagram of an image processor of the invention.

The following can be employed as the photosensitive materials used in the present invention:

There may be used a photosensitive material with which a visible image is obtained by hardening a polymerizable compound in image form using the image-form exposure method, as disclosed in commonly assigned Japanese Laid-Open Patent Publication No. 57-179836. An image-receiving material is then superposed on the hardened image to obtain a visible image by applying pressure. The photosensitive material may also be of the microcapsule type in which the capsules have a synthetic polymeric resin wall and contain a vinyl compound, a photochemical polymerization starting agent, and a coloring agent precursor. The microcapsules are provided on a substrate.

In addition, a type of photosensitive material may be used in which, following preliminary thermal developing or wet developing of a latent image, the latent image is superposed with an image-receiving material and a visible image is obtained by applying pressure. An example of such a material is disclosed in commonly assigned Japanese Laid-Open Patent Publication No. 61-278849. As described therein, an image is obtained on an image-receiving material by transferring a color image-forming material onto the image-receiving material following thermal developing. The photosensitive material contains at least a photosensitive silver halide, a reducing agent, a polymerizable compound and a color image forming material applied to the substrate, and at least the polymerizable compound and the color image forming material are sealed in the same microcapsules.

Another example is a so-called heat developable photosensitive material, by the use of which an image obtained by heat developing is transferred to an image-receiving material by heating. In this photosensitive material, a mobile dye is released by heating in the form of an image. The mobile dye is transferred onto an image-receiving material (dye fixing material) containing a mordant by means of a solvent such as water, by means of a high-boiling point organic solvent, or by means of a hydrophilic thermal solvent incorporated in the image-receiving material. Also, the mobile dye may be of a thermally diffusive or sublimatory type, and the dye transferred onto a dye accepting substrate material. Examples of such materials have been disclosed in U.S. Pat. Nos. 4,463,079, 4,474,867, 4,478,927, 4,507,380, 4,500,626 and 4,483,913, and Japanese Laid-Open Patent Publications Nos. 58-149046, 58-149047, 59-1522440, 59-154445, 59-165054, 59-180548, 59-168439, 59-174832, 59-174833, 59-1748834 and 59-174835.

Further, as an image-forming solvent, both distilled and ordinary tap water can be used. The image-forming solvent may also be a mixed solvent of distilled water and a low boiling point solvent such as methanol, DMF, acetone, or di-isobutylketone. In addition, the image forming solvent may be a solution in which is included an image formation accelerator, a fogging preventing agent, a development stopping agent, and/or a hydrophilic thermal solvent.

DESCRIPTION OF THE PREFERRED EMBODIMENTS

Referring to the accompanying drawings, preferred embodiments of the present invention will be described in detail.

FIG. 1 shows schematically an image forming device constructed according to the present invention. In this illustrative example, a photosensitive material which requires a heat developing process is used, and an image is transferred and formed on an image-receiving material having an image-receiving layer by use of an image-forming solvent such as water.

In a housing 12 constituting the image forming device there are provided a photosensitive material supply unit 13 holding a supply of photosensitive material A, an image reading unit 15 for reading image information carried by an original S, an exposing unit 16 for forming a latent image on the photosensitive material A, a water coating unit 17 for applying water to the photosensitive material A, a superposing unit 19 for superposing an image-receiving paper C on the photosensitive material A, a heat developing and transfer unit 21 for carrying out heat treatment on the photosensitive material A and the image-receiving paper C, and a peeling unit 23 for separating the image-receiving paper C from the photosensitive material A.

In the top surface part of the housing 12 there is arranged a transparent original supporting glass plate 14 for supporting the original S. The image reading unit 15 is arranged beneath the original supporting glass plate 14. The image reading unit 15 includes a system for scanning the entire surface of the original supporting glass plate 14, namely, a light source 18, a mirror 20a, an assembly 30 of an imaging lens, a filter unit and a light-detecting element, an image processor 200, an exposure device 300, and mirrors 20b and 20c moving one-half of the scanning distance in the same direction as the light source 18, and ancillary components. These components are surrounded by a partition 22, and are shielded optically from the remaining parts of the system. However, there is formed in the partition 22 an exposure aperture 34 for exposing the photosensitive material A with the exposing unit 16 in the area through which light emitted by the exposure device 300 passes.

Further, in the vicinity of the original supporting glass plate 14 there is provided a standard white plate 32 so as to be exposed by light from the light source 18.

The photosensitive material supply unit 13 is provided in the left-hand part of the housing 12 and is held in a light-tight manner. A freely detachable photosensitive material magazine 54 with a supply of the photosensitive material A wound therearound is mounted in the photosensitive material supply unit 13.

The photosensitive material supply unit 13 is provided with roller pairs 56a–56d for conveying the photosensitive material A from the magazine 54 to the exposing unit 16. Between the roller pairs 56a and 56b there is disposed a cutter 58 which cuts the photosensitive material A every prescribed length. In addition, an exposure table 60, arranged between the roller pairs 56c and 56d, is placed so as to face the exposure aperture 34 in the bottom face of the partition 22 that surrounds the image reading unit 15.

In the forward direction of the exposing unit 16 ("forward direction" as employed herein means the downstream side with respect to the direction of movement of the photosensitive material) there is provided a conveyor system composed of a roller pair 56c and guide boards.

The exposing unit 16 forms a latent image on the photosensitive material A by appropriate exposure, and the photosensitive material A with the latent image formed thereon is conveyed to the water coating unit 17 via the conveyor system.

The water coating unit 17, which is provided for facilitating transfer of the latent image formed on the photosensitive material A, includes a roller pair 56f, a squeeze roller pair 176, guide boards 172, and a water tank 174. The water tank 174 is filled with water, and the photosensitive material A is conveyed while being submerged in the water.

The photosensitive material A coated with water is conveyed to the superposing unit 19 by means of the squeeze roller pair 176.

On the other hand, in the right-hand part of the housing 12 there is provided an image-receiving paper supply unit 41 which holds a supply of an image-receiving paper C. That is, in the image-receiving paper supply unit 41 there is loaded an image-receiving paper magazine 43 in which is enclosed the image-receiving paper C. The image-receiving paper C within the magazine 43 is delivered by a roller pair 56h, and is cut to a prescribed length by a cutter 44 disposed in the forward direction of the roller pair 56h.

The cut image-receiving paper C is conveyed to the superposing unit 19 by a roller pair 56i.

In the forward direction of the superposing unit 19 there is provided a heat developing and transfer unit 21 which heats the superposed photosensitive material A, and transfers the image onto the image-receiving paper C.

The heat developing and transfer unit 21 is surrounded by a heat insulating partition 62, and includes a hollow cylindrical heating drum 74 including a halogen lamp 72 and an endless belt 84 wound around the outer circumferential surface of the heating drum 74 through an angle of about 270°. The belt 84 is supported by four belt supporting rollers 76, 77, 78 and 80. The heat developing and transfer unit 21 heats the photosensitive material A and the image-receiving paper C in the condition where they are superposed with each other. As a result of this heating, the latent image on the photosensitive material A is developed and transferred and transferred onto the image-receiving paper C.

The peeling unit 23 is provided within the partition 62. The peeling unit 23 is composed of a first peeling claw 232 for peeling the photosensitive material A from the image-receiving paper C, a second peeling claw 234 for peeling the image-receiving paper C from the heating drum 74, and a roller 56j for ejecting the image-receiving paper C to the outside of the partition 62.

In one of the forward directions of the heat developing and transfer unit 21 there are provided a discard tray 118 for receiving the previously heated photosensitive material A that is peeled from the image-receiving paper C by the peeling claw 232 and a roller pair 56k which directs the photosensitive material A into the tray 118. The discard tray 118 is provided below the heat developing and transfer unit 21.

Further, in the other forward direction of the heat developing and transfer unit 21 there are provided a take-out tray 120 for accommodating the previously heated, image-receiving paper and roller pairs 56l, 56m and 56n for conveying the image-receiving paper to the take-out tray 120. The image-receiving paper C, and a color photosensor receiving the resulting reflected light from the image-receiving paper C.

This apparatus is further equipped with a color density control unit 150, driving system (not shown) and system control unit (also not shown). The color density control unit 150 is connected to the assembly 30 of the image lens, filter unit, light-detecting element, and photosensor, and is arranged at an appropriate place within the housing. The driving system operates the color density control unit 150, the photosensitive material supply unit 13, and the image reading unit 15. The system control unit controls the overall apparatus, and for this purpose is connected to the cutters 44 and 58, the shutter control device 36, the water coating unit 17, the heat developing and transfer unit 21, and the peeling unit 23.

Next, referring to FIG. 2, a switching operation between the frame sequential exposure system and the dot sequential exposure system will be described.

Figure 2:
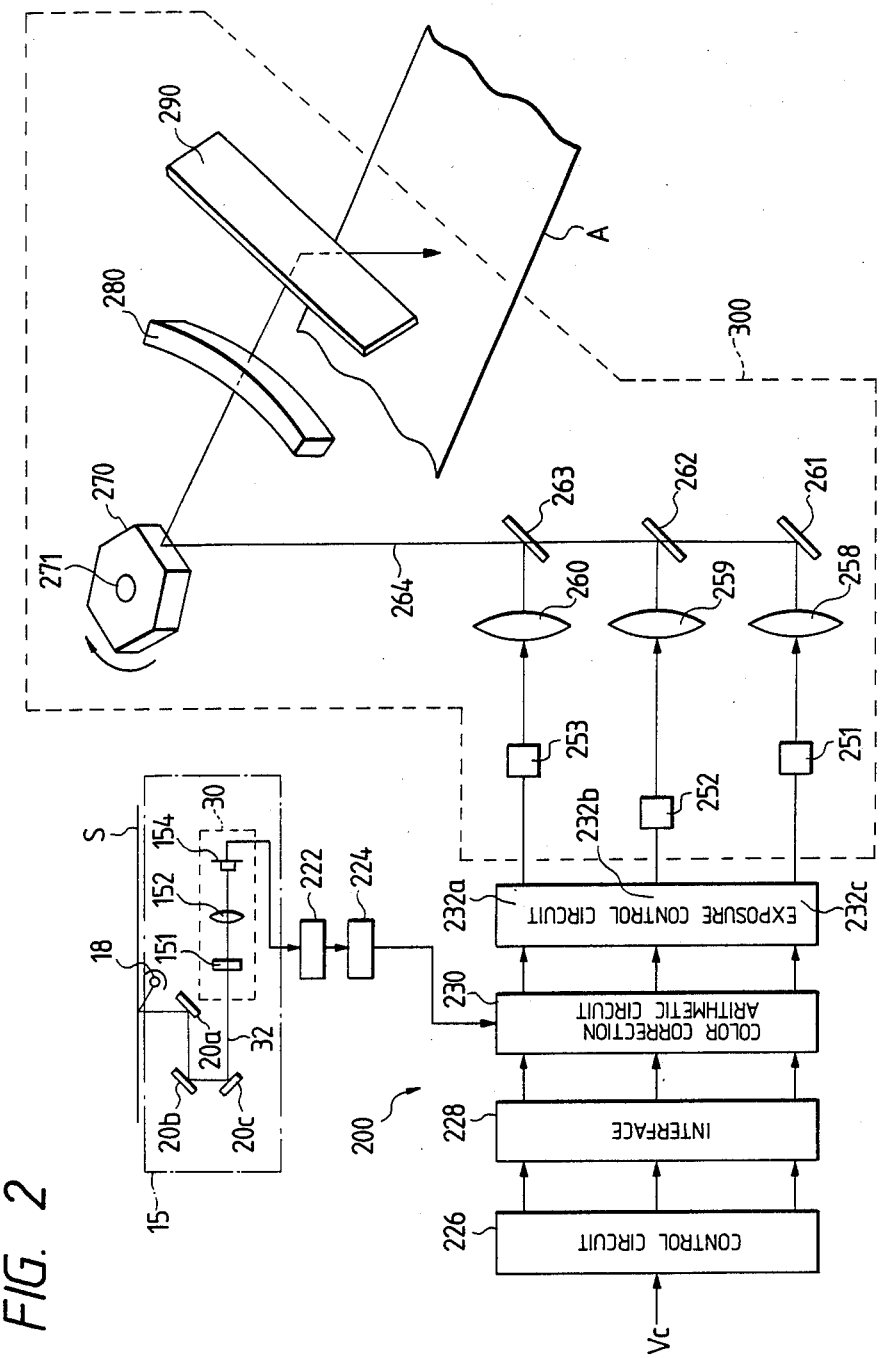
FIG. 2 is an exposure path diagram.

FIG. 2 is a schematic diagram showing the exposure path and the control path from the image reading unit 15 to the exposing unit 16.

The assembly 30 of the imaging lens, filter unit, and light-detecting element is constructed by a liquid crystal unit 151 arranged in a plane perpendicular to the optical axis 32, an imaging lens 152, and a CCD sensor 154 for carrying out photoelectric conversion, as shown in FIG. 2.

Figure 3:
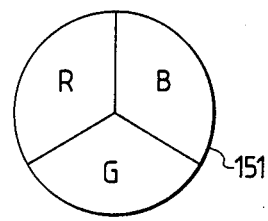
FIG. 3 is an enlarged diagram of a filter.

The liquid crystal filter unit 151 is divided into three color regions as shown in FIG. 3. The light reflected from a mirror 20c is split into the three primary colors, and light of each color continuously irradiates the CCD sensor 154 on a sequential time-division basis.

Figure 4:
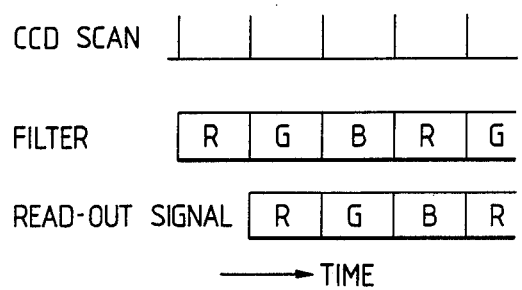
FIG. 4 shows a response vs. time diagram for a CCD sensor and filter.

By synchronizing the scanning of the CCD sensor 154 and the rotation of the filter unit 151 so as to sequentially irradiate the CCD sensor 154 with light of each color, it is possible to produce sequential signals for the three primary colors R, G and B, as shown in FIG. 4.

Thus, there is obtained an analog read-signal photoelectrically converted by the CCD sensor 154. The read-signal is supplied to an A/D converter circuit 222, which constitutes the next stage of the image processor 200. The read-out signal digitized by the A/D converter circuit 222, is supplied to a contour emphasis circuit 224 to correct the distortion in the spatial frequency response caused by the imaging lens 152 and the CCD sensor 154.

The output of the contour emphasis circuit 224 is supplied to a color correction arithmetic circuit 230. The color correction arithmetic circuit 230 is controlled by a control circuit 226 so as to determine the amount of exposure for each pixel (dot). During the recording of an image, color correction is carried out by the filter unit 150 corresponding to the recording condition.

Figure 5:
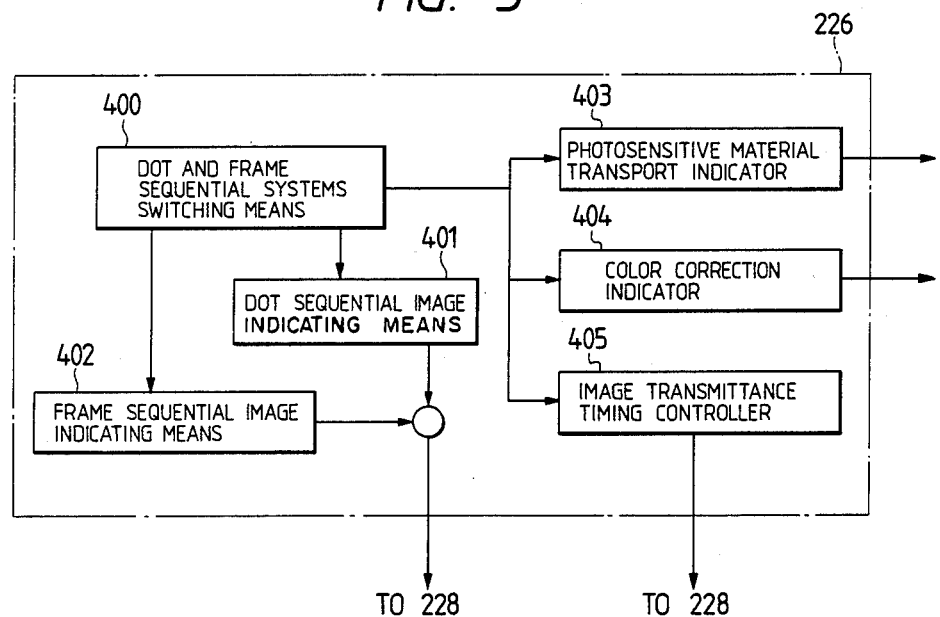

The control circuit 226, which is an image processor for forming a color image for computer graphics or the like, generates image data frame sequentially or dot sequentially, and carries out arithmetic processing for selecting the frame sequential exposure system or the dot sequential exposure system. As shown in FIG. 5, the control circuit 226 comprises dot and frame sequential systems switching means 400, dot sequential image indicating means 401, frame sequential image indicating means 402, photosensitive material transport indicator 403, color correction indicator 404 and image transmittance timing controller 405. In the case where the dot sequential exposure system is selected, the dot sequential image indicating means 401 is actuated by the dot and frame sequential systems switching means 400 to output a signal indicating the dot sequential exposure operation through the interface 228 to the color correction arithmetic circuit 230. In this case, three color signals are simultaneously transmitted with one another and the photosensitive material is transported only once in synchronization with the transmittance of the color signals. On the other hand, in the case where the frame sequential exposure system is selected, frame sequential image indicating means 402 is actuated by the dot and frame sequential systems switching means 400 to output a signal indicating the frame sequential exposure operation through the interface 228 to the color correction arithmetic circuit 230. In this case, the three color signals are separately and sequentially transmitted, and the photosensitive material is transported three times in synchronization with the transmittance of each color signal. The timing of the transmittance of the color signals are controlled by the image transmittance timing controller 405.

For example, when a copying operation is selected by a control signal Vc, the control circuit 226 controls the color correction arithmetic circuit 230 via an interface 228, and controls the amount of exposure for each pixel. An exposure signal which determines the amount of exposure is supplied simultaneously to the respective exposure control circuits 232a–232c, and the respective exposure control circuits 232a–232c control the semiconductor lasers 251, 252 and 253 shown in the exposure device 300 corresponding to the exposure signal.

As a result, the semiconductor lasers 251–253 emit light in response to the exposure signal, and the photosensitive material A is exposed to the combined light outputs.

In the exposure device 300, again light is emitted by the semiconductor laser 252, which radiates a laser beam of wavelength 810 nm. For the semiconductor laser 252, use may be made, for example, of a type LM0101 device manufactured by Sharp Corp.

The laser beam is shaped by being passed through a collimator lens 258, and is reflected by a total reflection mirror 261 toward a polygonal mirror 270.

Magenta light is emitted by a semiconductor laser 253, which radiates a laser beam of wavelength 670 nm. For the semiconductor laser 253, use may be made, for example, of a type TOLD 9200 device manufactured by Toshiba Corp.

Yellow light is emitted by a semiconductor laser 251, which radiates a laser beam of wavelength 750 nm. For the semiconductor laser 251, use may be made, for example, of a type LM030 device manufactured by Sharp Corp.

The laser beam is shaped by being passed through a collimator lens 260, and is reflected toward the polygonal mirror 270 by a dichroic mirror 263, which lets radiation of 750 nm and 810 nm pass through and reflects radiation of 670 nm.

The radiations in the three wavelengths propagate along the identical optical path 264 to be reflected by the polygonal mirror 270, pass through an fθ lens 280, are reflected by a mirror 290, and reach the photosensitive material A.

Then, by the rotation of the polygonal mirror 270 with its shaft 271 as the center, the image light exposes and scans the photosensitive material A, whereby there is formed an image on the photosensitive material A as a result of the movement of the photosensitive material A in a direction perpendicular to the scanning direction of the laser beam.

Next, the operation in the case when the frame sequential exposure system is selected will be described.

In this case, the control signal Vc is switched, and it is arranged to allow the control circuit 226 to be able to separately perform the operation of monochromatic gradation correction for every one of the three colors by means of the color correction arithmetic circuit 230. The color correction arithmetic circuit 230 supplies exposure signals for three colors to the exposure control circuits 232a–232c in a prescribed order, and each of the exposure control circuits 232a–232c drives the semiconductor lasers 251–253 separately in a prescribed order in response to the exposure signals.

A laser beam is emitted separately from each of the semiconductor lasers 252–253, and the exposure device 300 operates in the same manner as described above. In this case, however, radiations of the three wavelengths do not arrive at the polygonal mirror 270 at the same time. The photosensitive material A is exposed and scanned separately by radiations of three wavelengths, and, accordingly, a color image is formed on the photosensitive material A using three exposure-and-scanning operations.

In the foregoing, the operating mode of the above preferred embodiment of the present invention has been described. However, the present invention is not limited to the above mode and it is possible to employ various modifications.

For example, exposure may be carried out using an LED array, a linear CRT, a phosphorescent character display tube, an EL body, a liquid crystal high bulb, or the like in place of the semiconductor laser.

Further, it is also possible to carry out image recording similar to the above by spectrally splitting light passed through a negative or positive film, rather than reflected from an original document, into three colors.

Moreover, image information formed artificially by means of a computer or the like, instead of the read-out signal mentioned above, may be supplied to the control circuit to form an image corresponding to the image information on the photosensitive material. In this case too, the dot sequential exposure system and the frame sequential exposure system may be operated by appropriately switching between the two systems.

In accordance with the present invention, light-emitting elements that emit light in three colors are controlled by an exposure control circuit, which selects the simultaneous driving or the separate driving of the exposure control circuit, that is, the dot sequential exposure system or the frame sequential exposure system can be selected appropriately.

When the exposure control circuits are instructed to select simultaneous driving by the control circuit, the light-emitting elements are driven simultaneously by the respective exposure control circuit, whereby the photosensitive material is exposed dot-sequentially at high speed by means of a combined optical signal.

When exposure control circuits are driven separately, the light-emitting elements are driven separately so that the photosensitive material is exposed by monochromatic light in the frame sequential manner.

Therefore, it is possible to form an image on the photosensitive material by selecting one of the two exposure systems without adding a memory circuit to store image information.

What is claimed is:

1. In an image forming method for forming a color image by exposing a photosensitive material to light of three colors, the improvement comprising: providing at least three light-emitting elements which emit light of three colors, and selecting simultaneous three-color exposure or sequential monochromatic exposure of the photosensitive material by controlling the simultaneous or separate driving of the light-emitting elements in response to a three-color light signal.

2. The image forming method of claim 1, further comprising the step of, when sequential monochromatic exposure is selected, monochromatically correcting a gradation of light separately for each of said light-emitting elements.

3. The image forming method of claim 1, wherein, when simultaneous three-color exposure is selected, simultaneously color correcting signals of three-colors applied to said light-emitting elements.

* * * * *